US010438262B1

(12) United States Patent
Helmer et al.

(10) Patent No.: US 10,438,262 B1
(45) Date of Patent: Oct. 8, 2019

(54) METHOD AND DEVICE FOR IMPLEMENTING A VIRTUAL BROWSING EXPERIENCE

(71) Applicant: Amazon Technologies, Inc., Seattle, WA (US)

(72) Inventors: Scott Daniel Helmer, Seattle, WA (US); Junxiong Jia, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 781 days.

(21) Appl. No.: 14/740,045

(22) Filed: Jun. 15, 2015

(51) Int. Cl.
| | | |
|---|---|---|
| *G06Q 30/00* | (2012.01) | |
| *G06Q 30/06* | (2012.01) | |
| *G06K 9/00* | (2006.01) | |
| *H04N 7/18* | (2006.01) | |
| *G09G 5/14* | (2006.01) | |
| *G06T 19/00* | (2011.01) | |
| *G06F 3/0485* | (2013.01) | |
| *G09G 5/34* | (2006.01) | |

(52) U.S. Cl.
CPC ....... *G06Q 30/0623* (2013.01); *G06F 3/0485* (2013.01); *G06K 9/00577* (2013.01); *G06Q 30/0643* (2013.01); *G06T 19/006* (2013.01); *G09G 5/14* (2013.01); *G09G 5/34* (2013.01); *H04N 7/185* (2013.01)

(58) Field of Classification Search
CPC .................................................. G06Q 30/0643
USPC ....................................................... 705/27.2
See application file for complete search history.

(56) References Cited

U.S. PATENT DOCUMENTS

| | | | | |
|---|---|---|---|---|
| 2012/0062596 | A1* | 3/2012 | Bedi ................. | G06Q 30/0256 345/633 |
| 2014/0100997 | A1* | 4/2014 | Mayerle ............ | G06Q 30/0643 705/27.2 |
| 2014/0225814 | A1* | 8/2014 | English ............... | G02B 27/017 345/8 |
| 2014/0267419 | A1* | 9/2014 | Ballard ................. | G06T 11/00 345/633 |

(Continued)

OTHER PUBLICATIONS

Layar B.v.; "Acquiring, Ranking and Displaying Points of Interest for Use in an Augmented Reality Service Provisioning System and Graphical User Interface for Displaying Such Ranked Points of Interest" in Patent, Apr. 9, 2013 NewsRx (Year: 2013).*

*Primary Examiner* — Brittney N Miller
(74) *Attorney, Agent, or Firm* — Lee & Hayes, P.C.

(57) ABSTRACT

A virtual browsing experience may be implemented that allows a user to move a mobile device within a physical environment in order to control browser navigation to different items on an associated display. The virtual browsing experience improves the user's ability to recall where previously-viewed items are located in the virtual browsing environment. In some embodiments, a mobile device may determine its position and/or orientation in a physical environment, and when movement of the mobile device is detected, a user interface on an associated display may digitally navigate through multiple items according to the position and/or orientation of the mobile device. The position and orientation of the mobile device may be determined from position information or data obtained by a sensor device of the mobile device, and appropriate subsets of items can be determined for display based on detected movement of the mobile device.

21 Claims, 10 Drawing Sheets

(56) References Cited

U.S. PATENT DOCUMENTS

| | | | |
|---|---|---|---|
| 2015/0058164 A1* | 2/2015 | Soon-Shiong | G06Q 30/06 705/26.8 |
| 2015/0248785 A1* | 9/2015 | Holmquist | G06T 19/006 345/419 |

* cited by examiner

METHOD AND DEVICE FOR IMPLEMENTING A VIRTUAL BROWSING EXPERIENCE

BACKGROUND

Mobile devices, such as mobile phones, have relatively small displays, as compared to stationary devices with relatively larger displays, such as desktop computers, televisions, and the like. As a consequence, when a user desires to search and/or browse a collection of digital items on his/her mobile device, the number of items that can be simultaneously presented on the display screen is somewhat limited. Current user interfaces accommodate browsing a large collection of items on mobile displays by providing mechanisms (e.g., touch screen controls, hard or soft buttons, other pointing devices, etc.) that allow a user to scroll through a list of items or pan across a web page presenting the items in a two-dimensional (2D) matrix. In these scenarios, some of the items must move off the screen to make room for displaying new items as the user scrolls.

Browsing items in this manner can be a challenge for a user at least because it can be difficult for the user to recall how to get back to previously viewed items after those items have moved off of the screen. For example, the user may have to remember to scroll up a few pages (or clicks) in order to get back to a previously viewed item of interest. In this scenario, the user is typically hazarding a guess as to how many pages he/she must scroll through before finding the previously viewed. If the user is browsing a large collection of items, it can be difficult to remember this information. Therefore, the user will not be able to compare items easily and may not explore as many items as the user would otherwise like to.

In a physical browsing environment (e.g., a brick-and-mortar retail store with tangible items sitting on shelves), users have an easier time (as compared to virtual browsing) recalling where previously viewed items are located, and can more easily recall how to get back to those items that are no longer in the user's sight. This recall ability is lacking in virtual browsing experiences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
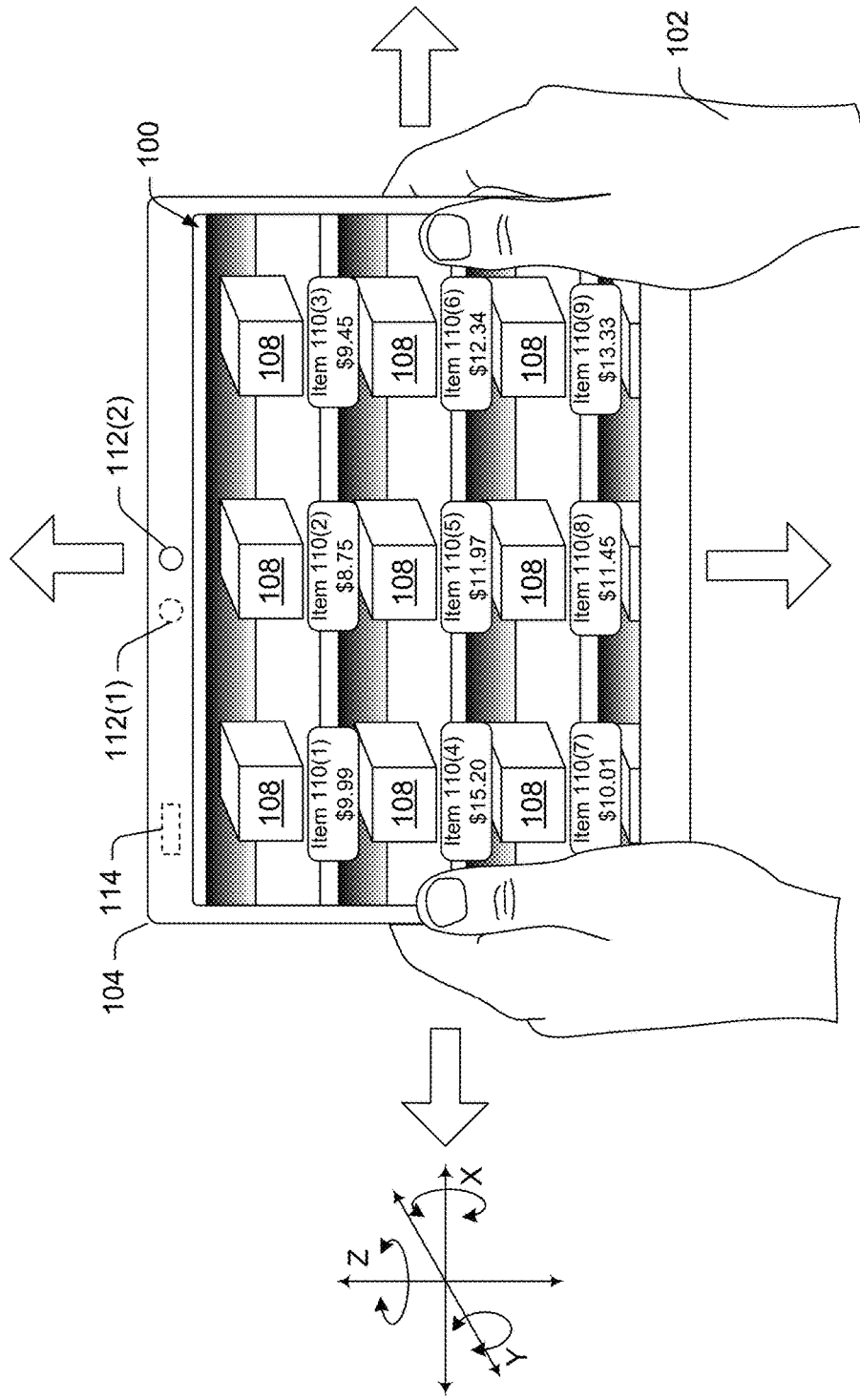
FIG. 1 illustrates an example screen rendering of a user interface that provides a virtual browsing experience.

Embodiments of the present disclosure are directed to, among other things, techniques, and systems for implementing a virtual browsing experience that improves a user's ability to recall where previously viewed items are located in a virtual browsing environment. The virtual browsing experience disclosed herein allows a user to move a device (i.e., change the position and/or orientation of the device) within a physical environment in order to control browser navigation to different items on a display. As compared to traditional scrolling and panning approaches to browsing, controlling browsing navigation by moving a device about a three-dimensional (3D) space makes it easier for the user to remember how to return to previously viewed items that have since moved "off-screen."

In some embodiments, a mobile device may determine where the mobile device is positioned and/or how the mobile device is oriented in a physical environment. When movement of the mobile device within the physical environment is detected, a user interface on an associated display may digitally navigate through multiple items according to the position and/or orientation of the mobile device. In some embodiments, a camera of the mobile device may be positioned so it is facing in a first direction, and a virtual browsing experience may be anchored to the first direction such that a display may render one or more image representations of items within a virtual environment (i.e., a virtual 2D or 3D space). As the mobile device moves within its physical environment, the image representations of the items may be updated on the display according to the movement of the mobile device. This solution provides proprioception feedback—an innate human sense of orientation in space—to the user, which provides the user with an improved sense of where previously-viewed items of interest are located (i.e., an improved ability to recall how to get back to previously-viewed items that have since moved "off-screen"). This, in turn, improves the user's digital browsing experience by allowing the user to more easily track where items are located in the virtual browsing environment to become more efficient in browsing.

In some embodiments, a process for implementing a virtual browsing experience includes obtaining, by a sensor device of a mobile computing device, first position information that is indicative of at least one of a first position or a first orientation of a mobile computing device, determining a first subset of multiple items to be displayed on a display associated with the mobile computing device, anchoring the first subset of the multiple items relative to the first position information, and displaying respective image representations of the first subset of the multiple items on the display. In response to movement of the mobile device, the process continues by obtaining, by the sensor device of the mobile computing device, second position information that is indicative of at least one of a second position or a second orientation of the mobile computing device, determining a second subset of the multiple items to be displayed based at least in part on the second position information, and displaying respective image representations of the second subset of the multiple items on the display associated with the mobile computing device.

The techniques and systems disclosed herein improve user efficiency by increasing user interaction performance (improving speed, accuracy, and usability) with a graphical user interface. This is due, at least in part, to enabling a user to associate or attach visual stimuli and proprioception to a particular item, which, in turn, allows for an improved browsing experience (e.g., easier visual comparison while shopping for items online). Furthermore, users will spend less time searching or browsing for items due to the proprioception feedback provided by the techniques disclosed herein. That is, navigating between items can be performed faster due to the precision of the physical senses—pointing to a physical location rather than repeatedly swiping, scrolling, or clicking in order to return to a previously viewed item. Moreover, the techniques disclosed herein allow for the implementation of augmented reality so that the user's physical environment can be viewed on the display relative to the virtual items displayed thereon, which provides improved proprioception feedback (e.g., the user can typically maintain a visual "lock" on real-world objects when the real world objects move "off screen" in order to quickly return to the off-screen items). Thus, the user can map an item to a position and/or orientation of the mobile device in the physical environment. Since moving/pointing a device has both visual and proprioception feedback, the user will be more likely to recall the location of a virtual item that has since moved off-screen.

The techniques and systems are described herein, by way of example, in the context of an electronic-commerce (e-commerce) environment where items can be searched and browsed for purchase. However, it should be appreciated that the embodiments described herein may be implemented in other contexts, such as browsing for any type of item (e.g., "free" items such as pictures/images, videos, search results, digital files (e.g., music files) in a personal collection, etc.).

FIG. 1 illustrates an example screen rendering of a user interface 100 that provides a virtual browsing experience. A user 102 is shown to be holding a mobile device 104 within a physical environment 106. The physical environment 106 may represent an indoor environment (e.g., a room inside a house or a building) or an outdoor environment.

The user interface 100 is configured to render image representations 108 of a plurality of items 110(1) through 110(9) (collectively 110) on a display associated with the mobile device 104. In the example of FIG. 1, the items 110 are available for purchase, and the user 102 is shopping/browsing the items 110 to decide what to purchase. In this scenario, the mobile device 104 may have connectivity to a wide area network (WAN), such as the Internet, to retrieve the items 110 based on a search query or browsing behavior (e.g., selection of filtering criteria, such as an item category, or another browsing filter). The virtual browsing experience may be implemented in an offline mode as well, such as when the items 110 have been downloaded to the mobile device 104 at a time in the past, or when the items 110 represent a collection of items 110 (e.g., pictures) stored in local memory of the mobile device 104.

In order to browse through the plurality of items 110, the user 102 can move the mobile device 104 within the physical environment 106, which thereby controls browser navigation to different, off-screen image representations 108 of the items 110. FIG. 1 illustrates the physical environment 106 as a 3D space, which can be defined by any suitable coordinate system, such as the illustrated Cartesian coordinate system having X, Y, and Z-axes. The mobile device 104 may be equipped with components that enable the mobile device 104 to determine its position and/or orientation in this 3D space, and to detect changes in its position and/or orientation within the physical environment 106.

For example, the mobile device 104 may be equipped with one or more cameras 112, such as the outward-facing camera 112(1) and/or the inward-facing camera 112(2) (collectively 112). Each camera 112 is configured to obtain image data (position information) by capturing a scene within its respective field of view. "Capturing an image of a scene," as used herein, may include addressing the scene using an image sensor(s) of the camera 112 and maintaining the associated image data for a period of time—which may involve maintaining the image data merely for purposes of transmitting the image data to relevant downstream components that process the image data, and/or maintaining the image data indefinitely by storing the image data in permanent storage (e.g., saving an image of the scene in memory of the mobile device 104). With the captured image data, the mobile device 102, which may also be equipped with computer vision and object detection software, can detect an object or other visually detectable features (hereinafter, "visual features") in a captured scene, and thereafter, analyze subsequently captured scenes (e.g., by analyzing multiple sequential frames) to detect a change in location of the object in the initial scene, or new objects in subsequently captured scenes. In this manner, the mobile device 104 may detect and track its own movement via the camera(s) 112.

In some embodiments, the mobile device 104 may be equipped with one or more motion sensors 114 for determining the position and/or orientation of the mobile device 104, and to detect changes in position and/or orientation of the mobile device 104 within the physical environment 106. The one or more motion sensors 114 may represent an inertial measurement unit (IMU) including gyroscopes, accelerometers, magnetometers or compasses, or any combination thereof. Moreover, any individual motion sensor 114, camera 112, or combination of the motion sensor(s) 114 and the camera(s) 112 may be utilized for obtaining position information or data that is indicative of the position and/or orientation of the mobile device 104. The motion sensor(s) 114 may be configured to sense and generate motion data (position information) in the form of translational and/or rotational movement about the 3D space of the physical environment 106 (i.e., six-component motion sensing). For example, the motion sensor(s) 114 may be configured to measure and generate data relating to the extent, rate, and/or acceleration of translational movement in 3D space (X, Y, and Z movement), as well as the extent, rate, and/or acceleration of rotation in 3D space (roll, pitch, and yaw). Measurements may be generated in terms of a 3D coordinate system, such as Cartesian or spherical coordinate systems. Motion data generated by the motion sensor(s) 114 may include measurements in terms of displacement (e.g., displacement since a preceding time log), velocity, and/or acceleration of translational movement and angular movement. Furthermore, position information or data obtained by the motion sensor(s) 114 and/or the camera(s) 112 may further include times (e.g., timestamps) at which the data is collected, and the data may be temporarily, or permanently, stored in memory of the mobile device 104.

Furthermore, referential position information (e.g., magnetic North) may be utilized with the motion sensor(s) 114 to provide a frame of reference of the position and/or orientation of the mobile device 104. For example, orientation (e.g., tilt) relative to a ground plane ("ground") may be determined in order to detect how the mobile device 104 (i.e., how a reference plane local to the mobile device 104) is oriented relative to ground.

Other techniques may be utilized for position determination, at least relative to nearby objects, such as using time-of-flight (ToF) imaging with the camera(s) 112 and an infrared emitter on the mobile device 104, received signal strength (RSS) from a nearby wireless access point, and the like. Furthermore, any combination of suitable techniques may be used to refine the position and/or orientation determination.

Accordingly, movement of the mobile device 104 can be tracked and used to determine where the mobile device 104 is pointed (i.e., how the device 104 is positioned and/or oriented) at any given time. The mobile device 104 may maintain a referential (e.g., origin) position and/or orientation (e.g. a first scene captured by the camera(s) 112 of the mobile device 104) in order to maintain a frame of reference for tracking movement and the direction thereof. In response to detecting movement of the mobile device 104 within the physical environment 106, the user interface 100 may update the image representations 108 of the items 110 rendered on the display of the mobile device 104 by smoothly panning the items 108 according to the position and/or orientation of the mobile device 104. The image representations 108 may be rendered within a virtual environment on a display associated with the mobile device 104. One example of a virtual environment is shown in FIG. 1 in the form of virtual shelves that the image representations 108 are disposed thereupon. Navigation through this virtual environment by moving the mobile device 104 within the physical environment 106 provides the user 102 with proprioception feedback, thereby improving browsing efficiency and improving the user's ability to recall how to get back to previously viewed items 110 that have since moved off-screen.

Figure 2:
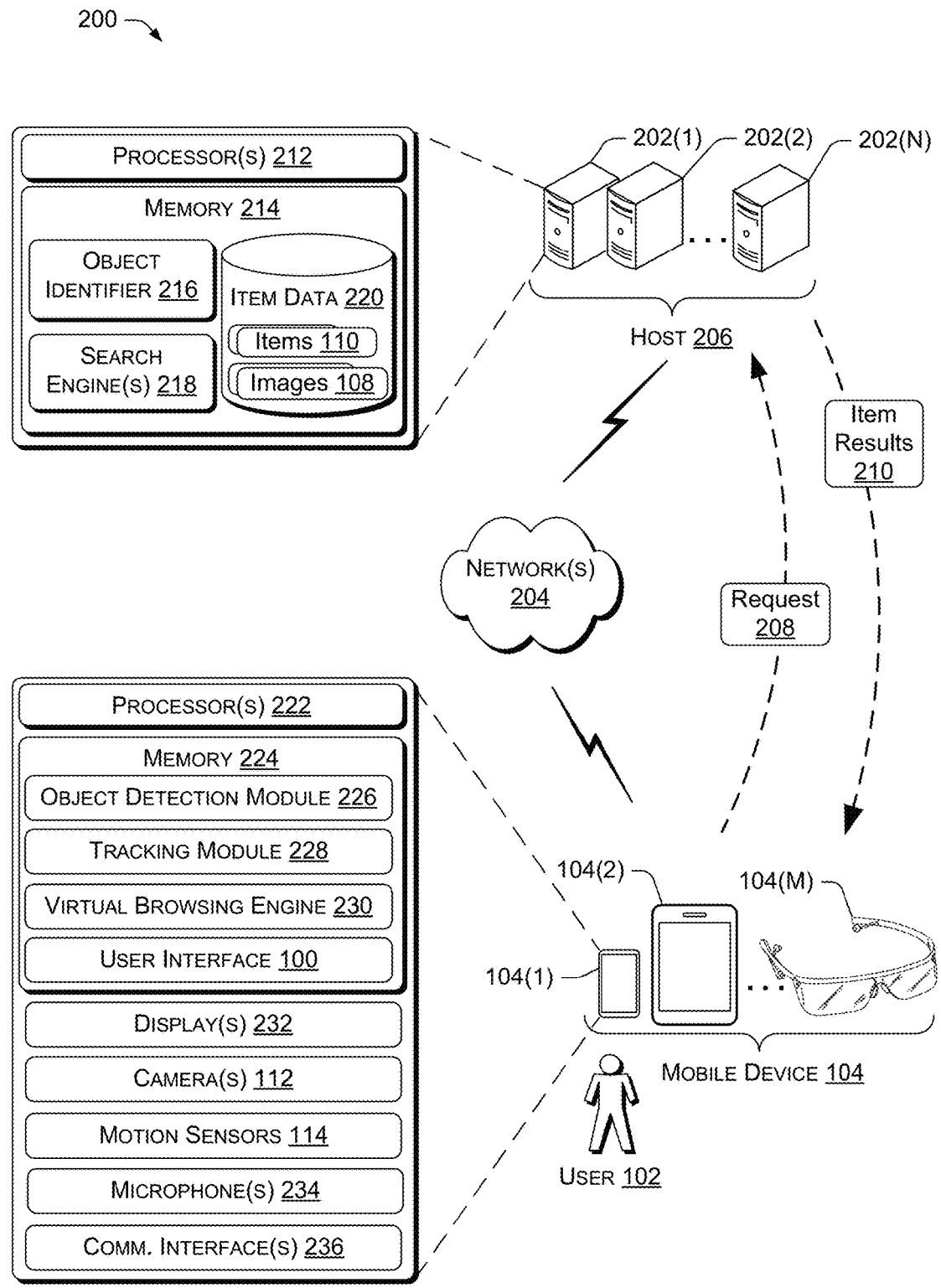
FIG. 2 illustrates an example architecture for implementing a virtual browsing experience.

FIG. 2 illustrates an example architecture 200 for implementing a virtual browsing experience. In the architecture 200, a user 102 may utilize a mobile computing device 104, such as the mobile computing devices 104(1), 104(2), . . . , 104(M) (collectively 104), to access one or more servers 202(1), 202(2), . . . , 202(N) (collectively 202) via a network(s) 204. The terms "users," "consumers," "customers," or "subscribers" may be used interchangeably herein to refer to the user 102. The mobile computing devices 104 (sometimes referred to herein as a "client device 104") may be implemented as any number of computing devices, including a mobile phone, a tablet computer, a laptop computer, an electronic-book (e-book) reader, a portable digital assistant (PDA), remote controller, a game controller, a wearable device (e.g., electronic "smart" glasses or similar head mounted displays (HMDs), a smart watch, etc.), and/or any other mobile electronic device that can transmit/receive data over the network(s) 204.

Furthermore, the network(s) 204 is representative of many different types of networks, and may include wired and/or wireless networks that enable communications between the various entities in the architecture 200. In some embodiments, the network(s) 204 may include cable networks, the Internet, local area networks (LANs), WANs, mobile telephone networks (MTNs), and other types of networks, possibly used in conjunction with one another, to facilitate communication between the server(s) 202 and the mobile device 104. Although embodiments are described in the context of a web-based system, other types of client/server-based communications and associated application logic could be used.

The server(s) 202, which may be arranged in a cluster or as a server farm comprising one or more fleets of servers 202, may be maintained and/or operated by a host 206 (e.g., a website) or another type of information distribution platform with additional types of distribution channels (e.g., electronic mail (e-mail), mobile applications, etc.), and so on. The components and modules executing on the server(s) 202 may reside on the same physical server(s) 202, or may be segregated physically and/or logically into separate layers with trust boundaries in between the layers. The server(s) 202 are capable of handling requests 208 from many client devices 104 and serving, in response, various information (e.g., web pages, application user interfaces, etc.) that can be rendered on displays of the mobile devices 104. In one example, the mobile device 104 may transmit a request 208 in the form of a search query (e.g., a text-based, voice-based, or image-based/visual search query), and the server(s) 202 may return item results 210 pertaining to the items 110 that are relevant to the search query. The host 206 can be any type of entity that hosts a portal (e.g., a storefront) that allows users 102 to view items that are available from an electronic marketplace. For example, the host 206 may represent a host of any type of site allowing for browsing of, and searching for, items in a repository of items, such as sites including, without limitation, merchandising sites, deal sites, group buying sites, informational sites, social networking sites, blog sites, search engine sites, news and entertainment sites, and so forth.

In some implementations, the host 206 provides an electronic marketplace containing a repository of items 110 that are available to users 102 for purchase. The items 110 may include, without limitation, tangible items, intangible items, products, goods, services, a bundle of items, digital goods or services that are downloaded or streamed (e.g., media clips), sellable units, events, or anything else which might be consumed, purchased, rented, subscribed to, leased, loaned or viewed (hereinafter "acquired") physically, digitally or otherwise, via a payment transaction or at no charge to the user 102.

In FIG. 2, the server(s) 202 are shown as being equipped with one or more processors 212 and one or more forms of computer-readable memory 214. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 214 may be used to store any number of functional, or executable, components, such as programs and program modules that are executable on the processor(s) 212 to be run as software. Each component stored in the computer-readable memory 214 may comprise computer-executable instructions that, when executed, cause the one or more processors 212 to perform acts and to implement techniques described herein. Each component may be in the form of data structures, program modules, or other data. The components included in the computer-readable memory 214 may include an object identifier 216 and a search engine(s) 218. The object identifier 216 and the search engine(s) 218 may access, directly or indirectly, item data 220 that stores a collection of items 110, and information associated with the collection of items 110, such as the image representations 108 of the items 110 for display on the mobile device 10. Additional item attributes may be stored in the item data 220, such as textual descriptions of the items 110, item quantities (e.g., inventory), metadata (e.g., tags, identifiers, etc.), transaction data (e.g., price of the items 110), item reviews, and so on.

In some embodiments, the user 102 may capture an image of a real-world object using the camera(s) 112 of his/her mobile device 104, and the mobile device 104 may transmit the captured image in the request 208 to the server(s) 202 as a visual (image-based) search query. Upon receipt of such an incoming request 208, the object identifier 216 may be configured to identify the real-world object in the captured image. In some embodiments, object identification may comprise matching the captured image transmitted in the request 208 with a stored image (e.g., an image of an item 110 stored in the item data 220). If a matching image is found, the matching image may identify the object as being an item 110 associated with the matching image. In some embodiments, the object identifier 216 may execute image analysis algorithms to recognize an object in the received image based on visual features of the image itself, and may devolve the recognized features into a text query that is used by the search engine(s) 218 to retrieve one or more items 110 matching the text query.

The search engine(s) 218 may be configured to access the item data 220 in order to retrieve items 110 and/or information relating to the items 110 based on search queries. For example, as described above, the search engine(s) 218 may receive a text string from the object identifier 216 that is used as a search query to locate an item(s) 110 relevant to the object identified by the object identifier 216. In other embodiments, the user 102 may transmit the request 208 by issuing a text or voice-based search query, and the search engine(s) 218 may search the item data 220 (and/or additional item data maintained on other servers of third party entities) and return items 110, or information related to items 110, relevant to the search query received in the request 208. The items 110 and related information retrieved by the search engine(s) 218 may be returned to the mobile device 104 by including the items 110, and image representations 108 of the items 110, in the item results 210. In some embodiments, the item results 210 may be ranked by relevance or other ranking criteria. In some embodiments, the item results 210 may be returned to the mobile device 104 based on filter criteria selection received from the user 102, such as when the user 102 selects an item category to browse items 110 in a specific category, or when the user selects a specific price range for returned items 110, and so on. In some embodiments, the server(s) 202 are capable of processing orders of items for users 102 and initiating fulfillment of the items 110 (e.g., by transmitting digital items 110 directly to the mobile device 104, or by sending tangible items 110 via mail or other physical delivery channel).

FIG. 2 further illustrates that the mobile device 104 is equipped with one or more processors 222 and one or more forms of computer-readable memory 224, which may represent processor(s) and memory similar to those described above with respect to the processor(s) 212 and the memory 214 of the server(s) 202. The components included in the computer-readable memory 224 of the mobile device 104 may include an object detection module 226 and a tracking module 228. The object detection module 226 and the tracking module 228 may interoperate to enable movement detection of the mobile device 104 using any suitable computer vision algorithm and/or object detection algorithm. In this manner, image data captured by the camera(s) 112 may be analyzed to identify objects and other visual features for feature tracking. Any suitable computer vision algorithms may be utilized by the object detection module 226 and the tracking module 228, such as pose and homography estimation, 3D perspective geometry, Hough transforms, scale invariant feature transform (SIFT), PhonySIFT, simultaneous localization and mapping (SLAM), speeded-up robust features (SURF), features from accelerated segment test (FAST), edge detection algorithms (e.g., Sobel, Laplacian, Canny, Roberts, Prewitt, etc.), and so on. In this manner, the object detection module 226 can detect objects and other visual features within a scene captured by the camera(s) 112, and the tracking module 228 may detect movement of the detected object, or new objects and/or visual features, in subsequently captured scenes to detect movement of the mobile device 104, and to determine a direction of the movement relative to a reference point (e.g., a first scene captured by the camera(s) 112).

In some embodiments, the tracking module 228 may be configured to detect movement of the mobile device 104 based on position information obtained by a sensor device of the mobile device 104. A "sensor device" for obtaining position information, as used herein, may include, without limitation, the camera(s) 112, the motion sensor(s) 114, a radio detection and ranging (radar) sensor device, a light radar (LIDAR) sensor device, a Global Positioning System (GPS) receiver, any other suitable sensor device configured to obtain position information, or a combination of any of the above types of sensor devices. The position information obtained by the sensor device may be indicative of at least one of a position or an orientation of the mobile device 104. In some cases, either the position or the orientation may be known or fixed as a given value. In this scenario, the sensor device may obtain position information indicative of the unknown parameter (i.e., either position or orientation). However, the sensor device may be configured to obtain position information that is indicative of both position and orientation of the mobile device 104.

A virtual browsing engine 230 may be configured to determine, as the mobile device 104 moves within the physical environment 106, subsets of the items 110 that were returned in the item results 210 that are to be displayed in correspondence with the respective positions or respective orientations of the mobile device 104 as the mobile device 104 moves within the physical environment 106. The determination of which subset of items 110 to render on the display of the mobile device 104 may be enabled by anchoring a first subset of items 110 to an initial reference position and/or orientation of the mobile device 104, and arranging the remaining items 110 within a virtual environment relative to the anchored first subset of items 110. The determined subset of items 110 may be provided to the user interface 100 for rendering image representations 108 of the items 110 on a display 232.

The display 232 may be integral to the mobile device 104, or the display 232 may be separate from, but communicatively coupled to, the mobile device 104. For example, the mobile device 104 may comprise a hand-held controller (e.g., a game controller) that is communicatively coupled to the display 232 (e.g., a television display in the user's living room). In some embodiments, the display 232 may comprise a "see-through" display, such as a head-mounted display (HMD) used with smart goggles/glasses.

FIG. 2 further illustrates that the mobile device 104 may include one or more microphones 234 (e.g., a microphone array) for receiving audible input, which may enable the user 102 to submit voice-based search queries. The mobile device 104 may further comprise a communications interface 236, such as a radio antenna, network interface (WiFi), and the like for sending/receiving data over the network 204.

Although various components, modules, and data of FIG. 2 are shown in specific locations, the components, modules, and data shown in FIG. 2 may be collocated physically and/or logically, spread or distributed across multiple machines and/or devices of FIG. 2, and may reside in various locations. Thus, the configuration is adaptable for the specific implementation desired. For example, the virtual browsing engine 230 may reside on the server(s) 202 such that a networked mobile device 104 may access the virtual browsing experience described herein via "the cloud." In this scenario, a user interface manager provided by the server(s) 202 may transmit data in real-time for rendering the user interface 100 on the mobile device 104. Furthermore, the virtual browsing engine 230 may be implemented via a Web browser implemented with hypertext markup language (HTML) code, via an online/cloud application accessible by the mobile device 104 over the network 204, or via a mobile application that can be executed in offline-mode or online-mode.

Figure 3:
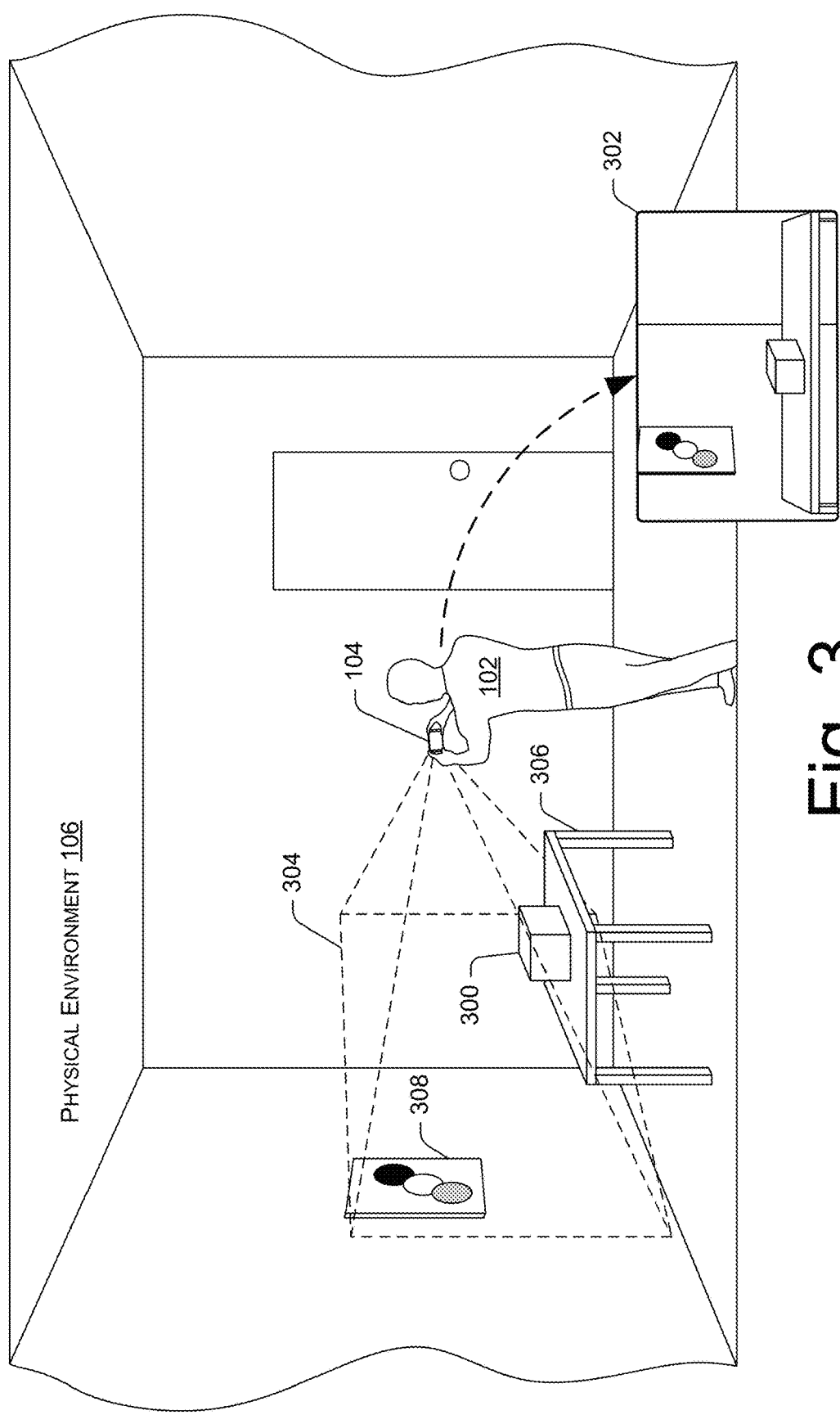
FIG. 3 is a schematic diagram showing a user initiating a virtual browsing experience.

FIG. 3 is a schematic diagram showing a user 102 initiating a virtual browsing experience. The user 102 is shown to be within a physical environment 106 (in this case, the physical environment 106 comprises a room inside a structure, such as a house), and the user 102 is holding a mobile device 104. In an illustrative example, the user 102 may notice a real-world object 300 in the physical environment 106 that he/she wants to have recognized by the host 206, perhaps so that the user 102 can determine whether an item 110 corresponding to the object 300 is available for purchase. In some embodiments, the user 102 may simply be interested in browsing other types of items 110 related to the object 300, such as pictures or videos related to the object 300.

To initiate the virtual browsing experience, the user may initially launch a mobile application, or a browser associated with the host 206, and this action may automatically invoke the camera functionality (e.g., a camera application) on the mobile device 104. With this functionality invoked on the mobile device 104, the user 102 may address, with the camera 112, a scene 302 containing the object 300. In some embodiments, the launched application or browser may prompt the user 102 (e.g., via visual and/or audible notification on the mobile device 104) to point the camera 112 in the direction of an object of interest. As shown in FIG. 3, the camera 112 of the mobile device 104 may be associated with a field of view 304 that encompasses the scene 302 to be captured by the camera 112.

The camera 112 may capture (automatically, or at the direction of the user 102 via button pushing, voice command, etc.) the scene 302 for submitting a visual search query in the request 208. Image data (position information) of the scene 302 may be transmitted over the network 204 to the server(s) 202 so that the object identifier 216 can identify the object 300, and thereafter, the search engine(s) 218 can retrieve one or more items 110 related to the identified object 300. In the example of FIG. 1, if the object 300 is a shoe sitting on a table 306, the object identifier 216 may identify the shoe within the scene 302, and may invoke the search engine(s) 218 to return item results 210 comprising a list of multiple shoes that may be available for purchase from the host 206. If the shoe is available as an item 110 for purchase via the electronic marketplace of the host 206, that particular item 110 may be returned to the mobile device 104, along with similar items 110 or related items 110.

In an alternative implementation, the user 102 may submit a text or voice-based search request 208 to the host 206, or the user 102 may select filtering criteria, such as an item category, to view item results 210. In this scenario, the user 102 may invoke the virtual browsing experience by launching a mobile application or browser associated with the host 206, and the user 102 may submit a search query in the form of a text-based query or a voice-based query. For example, the user 102 may type, or speak, the word "shoe" into the mobile device 104 that is executing the application or the browser, and the server(s) 202 may return multiple items 110 to the mobile device 104 that relate to that search query. In some embodiments, the user 102 may select an item category or other filtering criteria to browse a particular collection of items 110.

Regardless of how the virtual browsing experience is initiated, the user 102 may begin browsing the item results 210 by positioning the mobile device 104 in a first position and/or orientation (such as the position and orientation shown in FIG. 3) to view a first set of items 110, and then the user 102 can move the mobile device 104 about the physical environment 106 to navigate to additional items 110. The initial position/orientation of the mobile device 104 "sets" the virtual environment in which the items 110 are rendered by establishing a point of reference for the virtual browsing engine 230. Upon positioning the mobile device 104 in the first position and/or orientation (e.g., pointing the camera 112 so that it is facing forward and away from the user 102—as if the user 102 was taking a picture), the mobile device 104 may obtain first position information (e.g., a first scene 302, first motion data by the motion sensor(s) 114, etc.) that is indicative of the first position and/or orientation of the mobile device 104.

In some embodiments, the camera 112 may capture an image of the first scene 302, and the image data associated with the first scene 302 may be used to indicate the first position and/or orientation of the mobile device 104. The mobile device 104 may not understand the true, global direction in which the camera 112 is pointed, but the first scene 302 may nonetheless act as an initial "anchor" position from which relative directional movement can be ascertained. In some embodiments, the motion sensor(s) 114 may be utilized with the camera 112, or separately without the camera 112, to aid in the determination of the first position and/or orientation. For example, referential position data may be obtained by the motion sensor(s) 114, and this referential position data may be indicative of the first position and/or orientation of the mobile device 104 (e.g., it may be determined that the mobile device 104 is pointing in the magnetic North direction based on data from a magnetometer—a type of motion sensor 114).

In this first position and/or orientation, a user interface, such as the user interface 100 shown in FIG. 1, may be displayed on the display 232 of the mobile device 104. In doing so, the virtual browsing engine 230 may determine that a subset of items 110, such as the items 110(1)-(9) shown in FIG. 1, are to be anchored to the first position and/or orientation of the mobile device 104. This first subset of items 110(1)-(9) to be displayed may correspond to items 110 that are most relevant to a query included in the request 208 (such as a visual search query for the object 300). In some embodiments, anchoring the first subset of items 110(1)-(9) to the first position and/or orientation of the mobile device 104 may comprise linking or otherwise associating the first subset of items 110(1)-(9) to the first scene 302 captured by the camera 112 of the mobile device 104. In this manner, a virtual environment can be mapped to the physical environment 106 using the first position and/or orientation of the mobile device 104 as an anchor that links to a portion of (e.g., a set of coordinates within) the virtual environment, and the remaining items 110 that are included in the item results 210 may be arranged within the virtual environment relative to the position of the first subset of items 110(1)-(9) within the virtual environment.

When the user 102 moves the mobile device 104 within the physical environment 106, the mobile device 104 can detect such movement (e.g., by feature tracking via the camera 112, obtaining motion data via the motion sensors 114, etc.), and the virtual browsing engine 230 can determine the appropriate subset of items 110 to render on the display 232 via the user interface 100. In the implementation where the user 102 submits a text or voice-based query to the host 206, the mobile device 104 may detect the object 300 in the physical environment 106 for the purpose of feature tracking and detecting motion using computer vision techniques. In this scenario, it is less important to determine what the object 300 is, as it is to detect that the object 300 is in the scene 302 captured by the camera 112. In other words, the mobile device 104 may capture, via the camera 112, the scene 302 and use the scene 302 as an anchor (or referential position) to initiate the virtual browsing experience, and movement of the mobile device 104 may be detected by tracking the object 300 as a visual feature in the image data captured by the camera 112. The object detection module 226 and the tracking module 228 are configured to track this movement, and the direction of the movement by tracking visual features in a series of captured scenes (e.g., frames) using computer vision algorithms. This helps determine how the camera is moving relative to the detected object 300 so that the virtual browsing engine 230 can determine how to render the image representations 108 of the items 110 on the display 232 of the mobile device 104, panning or scrolling the image representations 108 smoothly across the display 232 as the mobile device 104 moves in the physical environment 106.

Figure 4A:
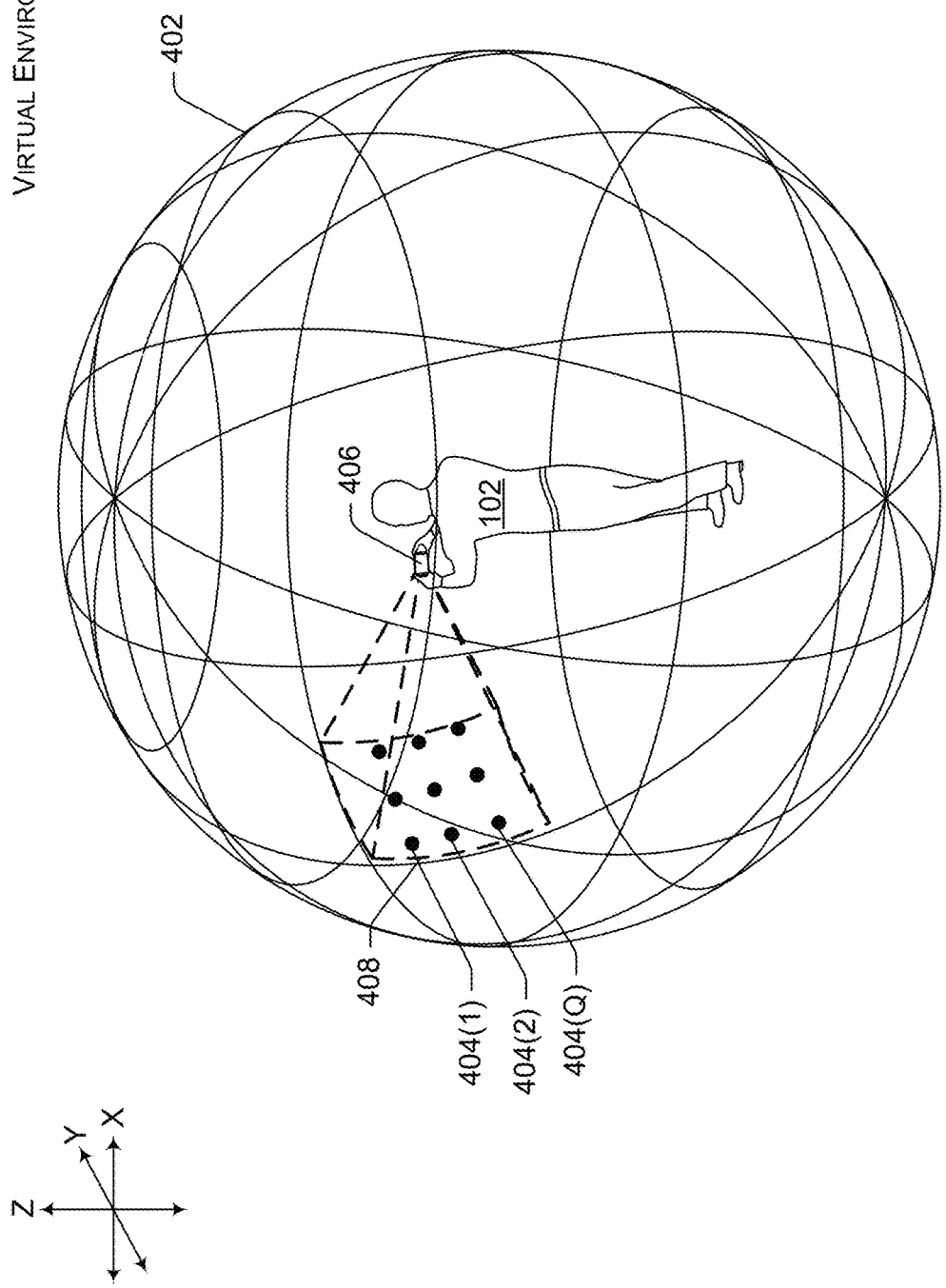
FIG. 4A is a schematic diagram of an example virtual environment for implementing a virtual browsing experience.

FIG. 4A is a schematic diagram of an example virtual environment 400 for implementing a virtual browsing experience. The virtual environment 400 may comprise any suitable configuration, such as a 2D area/plane or a 3D space. Items 110 (or the image representations 108 thereof) can be arranged within the virtual environment 400 for presentation on the mobile device 104 in the predetermined arrangement. The virtual environment 400 may be described or defined in terms of any suitable coordinate system, such as Cartesian or spherical coordinate systems, and/or azimuth, elevation, and magnitude parameters from a center of the virtual sphere 402. FIG. 4A shows the virtual environment 400 as comprising a virtual sphere 402, although the virtual environment 400 may take on any suitable geometrical shape, such as a cube, pyramid, a 2D plane, or any suitable shape. The virtual environment 400 may be described in terms of coordinates 404(1)-(Q) that define its geometry, such as the virtual sphere 402 of FIGS. 4A and 4B. The coordinate system of the virtual environment 400 may also include a virtual location 406 of the mobile device 104 in order to fix a frame of reference of the user 102 within the virtual environment 400. Furthermore, a portion 408 of the virtual environment 400 may be defined in terms of a subset of coordinates 404 that can be anchored to the first position and/or orientation of the mobile device 104. For example, the subset of coordinates 404 that define the portion 408 may be linked to the first scene 302 captured by the camera 112, and/or linked to the first motion data obtained by the motion sensor(s) 114 in order to anchor the virtual browsing experience with respect to the portion 408 of the virtual environment 400.

Figure 4B:
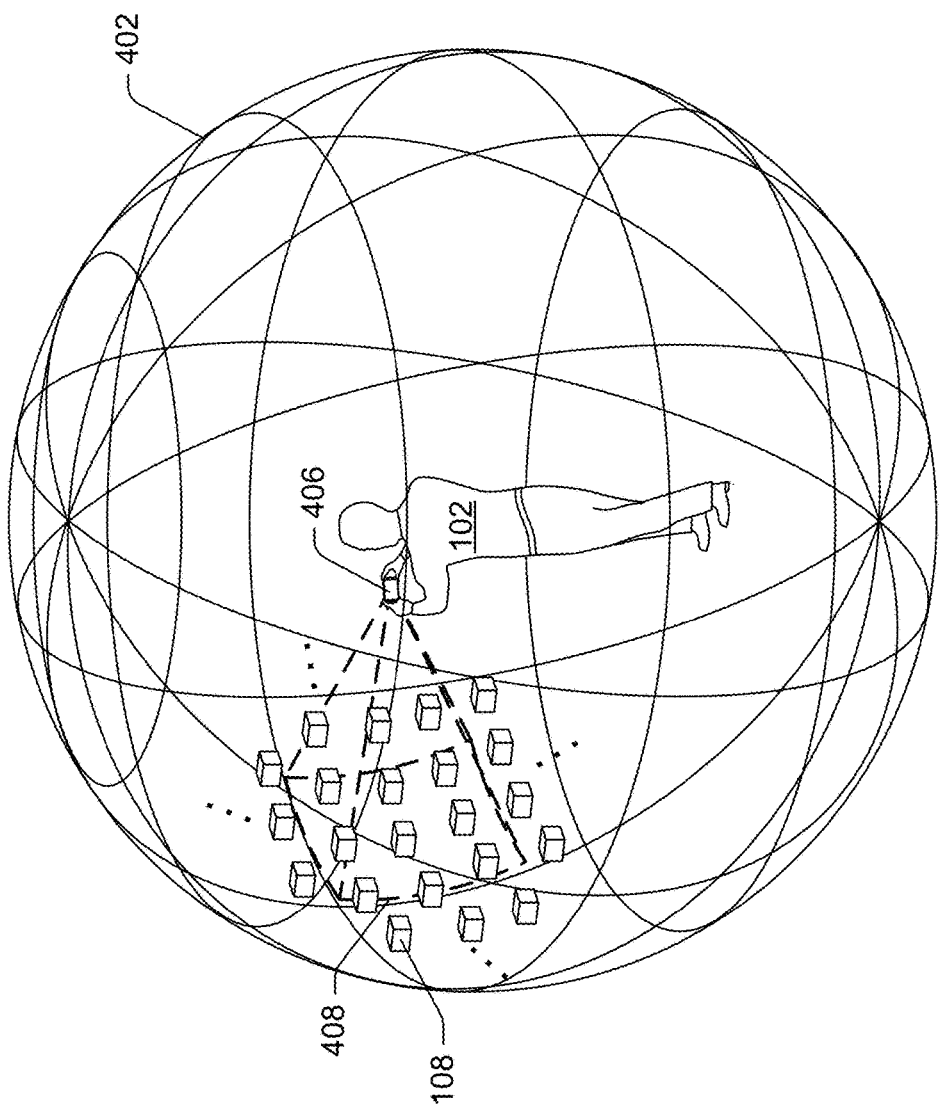
FIG. 4B is a schematic diagram of the virtual environment of FIG. 4A with items arranged within the virtual environment.
Figure 4B:
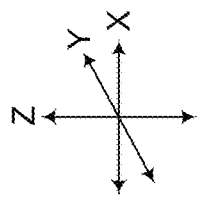

FIG. 4B is a schematic diagram of the virtual environment 400 of FIG. 4B further depicting a plurality of image representations 108 that correspond to a plurality of items 110 arranged within the virtual environment 400. The image representations 108 and their corresponding items 110 may be assigned to particular coordinates 404 within the virtual environment 400 so that the items 110 can be arranged in any manner or arrangement. The image representations 108 within the portion 408 of the virtual environment 400 may represent the items 110 that are most relevant to a search query submitted by the user 102 in the request 208, while image representations 108 that are arranged to be outside of the portion 408 may represent items 110 that are less relevant than the items 110 within the portion 408. In some embodiments, a single most relevant item 110 may be anchored to a corresponding object 300 in the scene 302 of FIG. 3 where the image representation 108 of the most relevant item 110 is taken as the origin location (0, 0) in terms of the virtual environment 400, and all of the other image representations 108 may be anchored relative to the image representation 108 for the most relevant item 110. In some embodiments, the image representations 108 may be linked to visual features detected in the scene 302, such as the object 300 and the picture frame 308 within the scene 302 of FIG. 3. In this manner, the image representations 108 may be overlaid on the visual features of the scene 302 for an augmented reality implementation.

Anchoring a subset of coordinates 404 and/or a subset of image representations 108 to a first scene 302 captured by the camera 112 may facilitate inferring camera parameters (e.g., pose, attitude, etc.) so that when the user 102 moves the mobile device 104 within the physical environment 106 to browse the items 110, the movement of the mobile device 104, and direction of movement, can be determined. For example, the tracking module 228 can determine that the mobile device 104 has moved from a first coordinate (0, 0—the origin) to a second coordinate (100, 100) within the virtual environment, and the appropriate image representations 108 may be determined and retrieved for rendering on the display 232. Anchoring a subset of coordinates 404 and/or a subset of image representations 108 may be performed as a pre-processing step before the first subset of image representations 108 are rendered on the display 232.

When the first subset of image representations 108 is rendered on the display 232, they may be rendered within the virtual environment 400 in various ways. For example, the image representations 108 may be rendered against a blank (e.g., white) background, or they may be rendered as if they were sitting on virtual shelves, or any other depiction that makes the virtual browsing experience more realistic and enjoyable for the user 102. Furthermore, although FIGS. 4A and 4B depict a virtual sphere 402 as a framework for arranging the image representations 108 of the items 110 in the virtual environment 400, other shapes and configurations are contemplated herein. For example, the image representations 108 may be arranged in the virtual environment 400 in a substantially flat, 2D matrix as one would imagine the items 110 sitting on straight shelves of a retail store. The user 102 may walk to the right or left with the mobile device 104 in hand, which may cause the 2D arrangement of image representations 108 to pan across the display screen.

Figure 5:
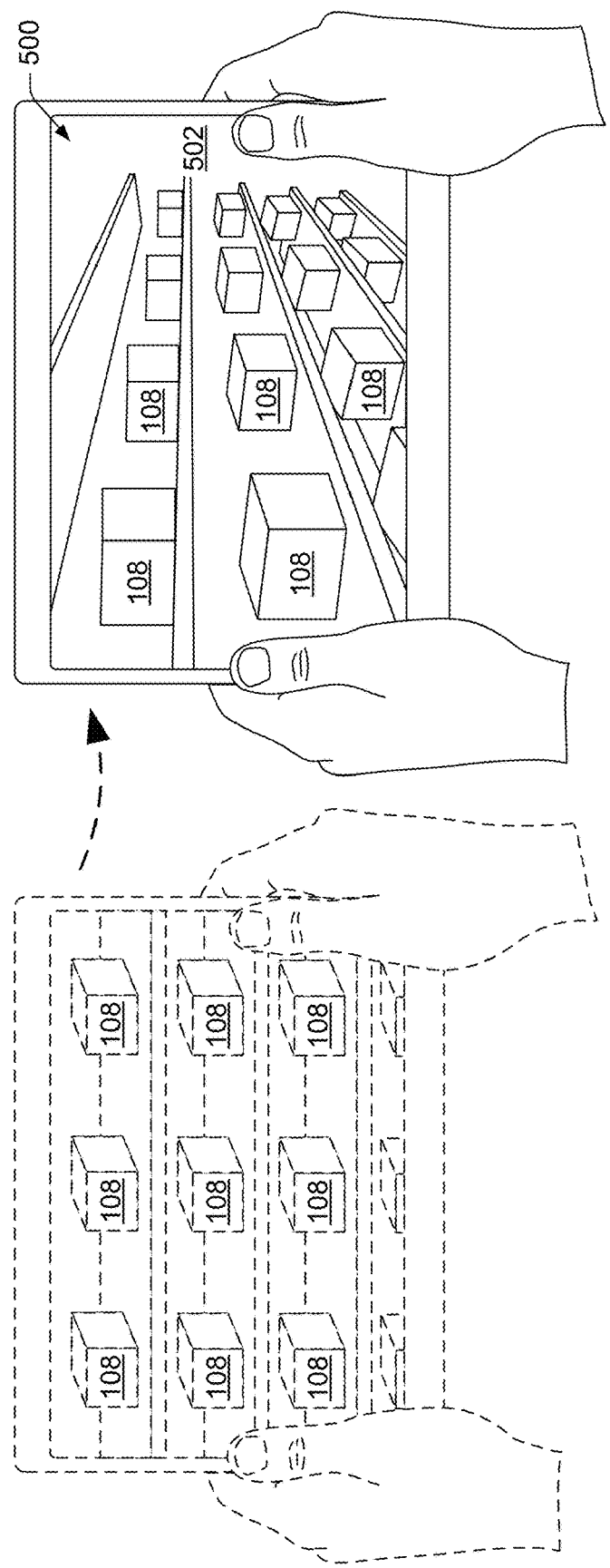
FIG. 5 illustrates an example screen rendering of a user interface that provides a virtual browsing experience.

Additionally, or alternatively, as shown in the example of FIG. 5, the user 102 may turns and/or rotate the device 104 to the right or left, and in response to such movement of the device 104, a user interface 500 may render a view of the image representations 108 that looks at the image representations 108 obliquely down a virtual isle 502 with the image representations 108 arranged on virtual shelves of the virtual isle 502. However, the virtual sphere 402 illustrated in FIGS. 4A and 4B may offer the convenience of the user 102 standing in one place and turning (e.g., spinning around, looking up and down, etc.) to view image representations 108 of items 110 that are surrounding the user 102 within the virtual environment 400. Furthermore, the virtual sphere 402 may offer the advantage of using image representations 108 that comprise images of the items 110 taken from a single viewpoint (e.g., a single perspective view of the items 110). Meanwhile, the virtual browsing experience illustrated in FIG. 5 may involve using multiple image representations 108 of the items 110 that have been stitched together in an image-processing step before rendering the image representations 108 on the display 232. In this manner, the user 102 may perceive the image representations 108 with a sense of depth.

Figure 6:
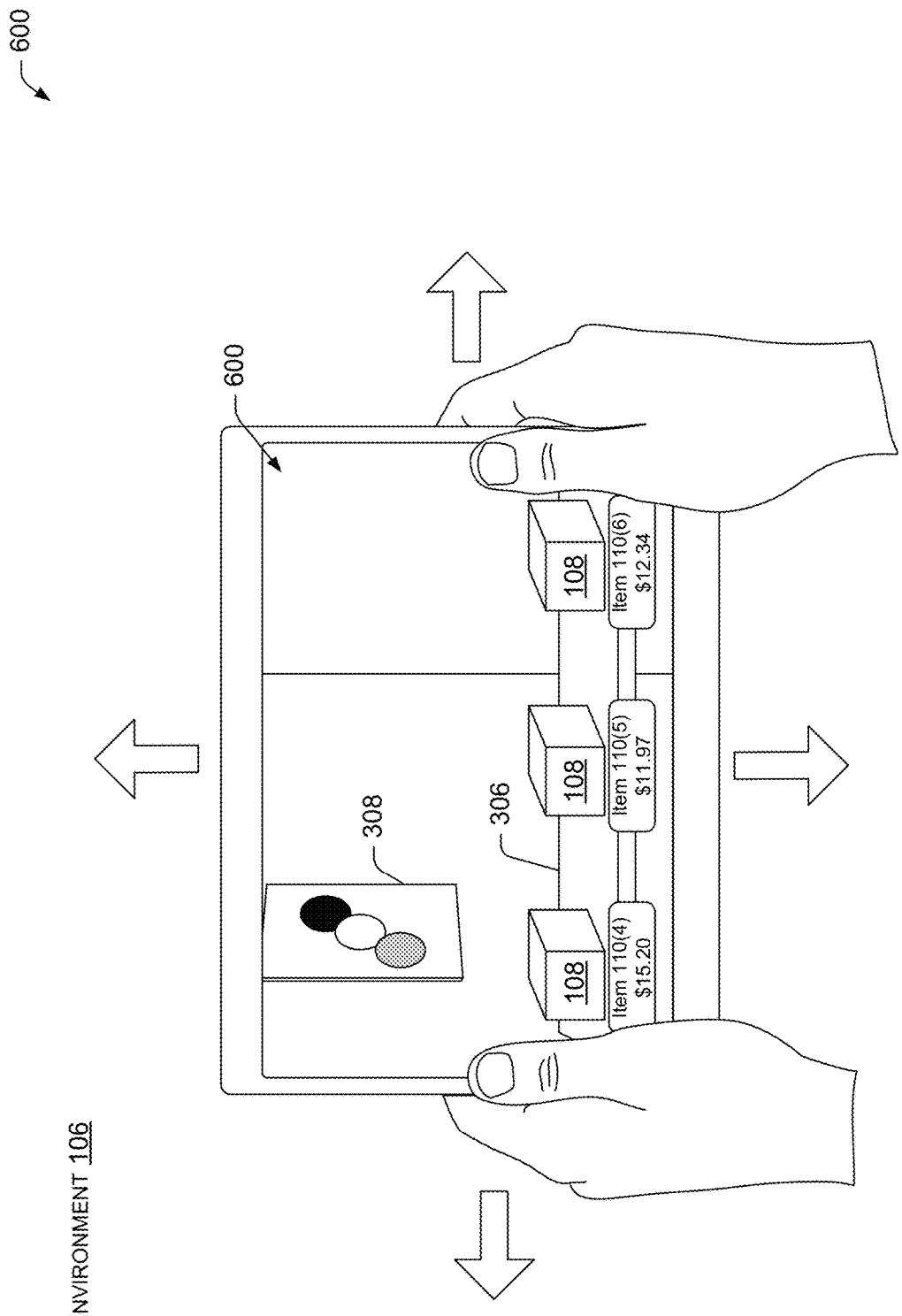
FIG. 6 illustrates an example screen rendering of a user interface that provides a virtual browsing experience.

FIG. 6 illustrates an example screen rendering of a user interface 600 that provides a virtual browsing experience. In the example of FIG. 6, the user interface 600 displays the physical environment 106 captured by the camera 112 of the mobile device 104 as the background of the user interface 600, and one or more virtual image representations 108 of items 110 are displayed overlaying the background to present an augmented reality image on the display 232. This may be referred to as "ghosting the background scene" into the display 232 because it involves a combination of the real-world physical environment 106 displayed as the background, and virtual objects in the foreground of the user interface 600.

The augmented reality user interface 600 may improve the ability for the user 102 to recall how to get back to previously-viewed items 110 of interest because the user 102 has real-world visual cues or stimuli presented on the display 232 that remain in the user's peripheral vision as the user 102 moves the mobile device 104 around the physical environment 106. In the example where the user 102 has positioned the mobile device 104 to capture the object 300 in the physical environment 106 for submitting a visual search query of the object 300, the item 110(5) shown in FIG. 6 may correspond to an item 110 that is most relevant to the object 300 (e.g., a similar object that is offered for sale via the electronic marketplace of the host 206). Furthermore, the image representation 108 of the item 110(5) may overlay the object 300 in the user interface 600 such that the real-world object 300 is obscured from view (i.e., hidden or invisible) in the user interface 600. Thus, the user 102 can be presented with an augmented reality experience that he/she is viewing the item 110(5) within the physical environment 106. Alternatively, the image representation 108 of the item 110(5) may be presented on the display 232 in a location that is adjacent to the real-world object 300 so that the real-world object 300 is not obscured by the image representation 108. In some embodiments, other virtual objects or elements may be displayed in the user interface 600 such that the virtual objects overlay the real-world scene 302. For example, virtual price tags, virtual labels, or graphical icons may be placed on (i.e., overlaying), or around (i.e., next to) the real-world object 300 in the scene 302, or the virtual objects/elements may be placed on or around other real-world objects that are detected in the scene 302.

In some embodiments, image representations 108 of the items 110 can be embedded into the scene 302 in even more "realistic" ways, such as by placing the image representations 108 atop, and anchoring the image representations 108 to, a supporting (e.g., substantially flat) surface that is detected in the scene 302, such as the substantially flat, top, supporting surface of the table 306. In this manner, the user 102 can browse the items 110(4)-(6) in a more intuitive manner, as if they are sitting on top of the table 306 in the physical environment 106. In another example, a wall in the physical environment 106 may be detected by the object detection module 226 to be a supporting surface on which the image representations 108 may be displayed as resting on virtual shelves mounted to the supporting surface. In this manner, the image representations 108 of the items 110 may be depicted as being mounted, via virtual shelves, on the wall in the physical environment 106. Detecting objects in the scene 302 that qualify as supporting surfaces (e.g., objects having substantially flat surfaces, or objects having at least substantially flat portions on which virtual objects, such as the image representations 108, can be situated) may be performed with the above-mentioned object detection and computer vision algorithms. That is, object detection and computer vision may be utilized to infer the 3D position of the object having the supporting surface (e.g., the top surface of the table 306) and to render the image representations 108 on the supporting surface of the table 306.

In some embodiments, the user 102 can explore a virtual object (e.g., the image representation 108 of the item 110(5) in FIG. 6) from different viewpoints, perspectives, or angles. By positioning the mobile device 104 and the camera 112 in close proximity to the object 300, the user 102 can move the mobile device 104 around the object 300, and in response, the user interface 600 may render different views of the image representation 108 that is overlaying the object 300.

The processes described herein are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
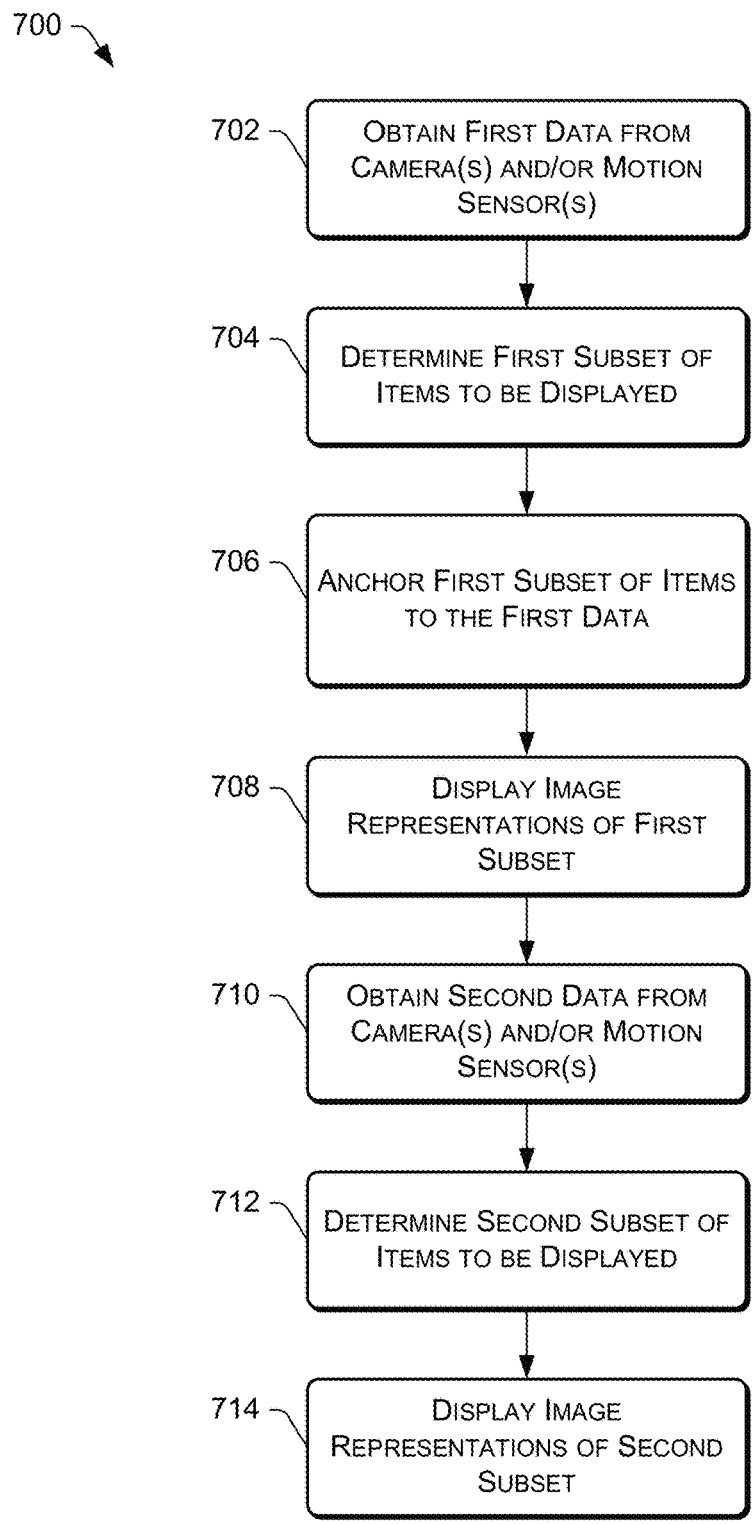
FIG. 7 is a flow diagram of an illustrative process for implementing a virtual browsing experience on a mobile device.

FIG. 7 is a flow diagram of an illustrative process 700 for implementing a virtual browsing experience on a mobile device 104. For discussion purposes, the process 700 is described with reference to the architecture 200 of FIG. 2.

At 702, a mobile device 104 may be positioned and oriented in a physical environment 106, and may obtain first data (or position information) from a camera(s) 112 and/or a motion sensor(s) 114 of the mobile device 104. The first data is indicative of a first position and/or orientation of the mobile device 104. For example, the camera(s) 112 may capture a first scene 302 associated with image data (e.g., visual features and detectable objects in the first scene 302, etc.). As another example, the motion sensor(s) 114, either independently or in combination with the camera(s) 112, may obtain the first data in the form of motion data (e.g., referential position information indicating the mobile device 104 is oriented at some direction relative to magnetic North).

At 704, the virtual browsing engine 230 may determine a first subset of items 110 to be displayed on a display 232 associated with the mobile computing device 104. For example, the mobile device 104 may have previously received items results 210 from the server(s) 202, or may have items 110 stored in memory 224 of the mobile device 104, that are to be displayed for browsing purposes, and the first subset of items 110 determined at 704 may be chosen based on various criteria. For instance, the first subset of items 110 may be the items 110 included in the item results 210 that are most relevant to a search query, or they may be the items 110 in a selected item category with the most favorable customer reviews, and so on.

At 706, the virtual browsing engine 230 may anchor the first subset of items 110 to the first data obtained at 702. The anchoring at 706 may include anchoring respective image representations 108 of the first subset of items 110 to the first data (e.g., a first scene 302 captured by the camera 112). The anchoring at 706 may also facilitate the inference of camera parameters (e.g., pose, attitude, etc.) so that when the user 102 moves the mobile device 104 within the physical environment 106 to browse the items 110 included in the item results 210, the movement of the mobile device 104, and direction of movement, can be determined.

At 708, the user interface 100 of the mobile device 104 may display or otherwise render respective image representations 108 of the first subset of the items 110 on the display 232 associated with the mobile device 104. In some embodiments, the image representations 108 are displayed against a blank background on the display 232. In other embodiments, the image representations 108 are displayed within a discernable virtual environment 400, such as by displaying the image representations 108 on virtual shelves or hanging on other virtual objects. In some embodiments, the image representations 108 themselves, and/or the virtual environment 400 in which they are rendered, may exhibit a 3D appearance or depth to give the user 102 a sense of immersion within the virtual environment 400. In some embodiments, the image representations 108 may overlay real-world objects (e.g., the object 300) in a first scene 302 captured by the camera(s) 112 of the mobile device 104 so that an augmented reality user interface, such as the user interface 600 of FIG. 6, can be output on the display 232.

At 710, the mobile device 104 may obtain second data (or position information) from the camera(s) 112 and/or the motion sensor(s) 114 of the mobile device 104 that is different from the first data obtained at 702 to indicate that the mobile device has changed its position and/or orientation within the physical environment 106. For example, a second scene captured by the camera(s) 112 may be analyzed by the object detection module 226 to detect an object 300 in the second scene, and the tracking module 228 may determine if the object 300 has moved in position relative to its position in the first scene 302, or whether the object 300 is a new object that was not present in the first scene 302. In this manner, the second data obtained at 710 can indicate to the mobile device 104 that it has changed in position and/or orientation within the physical environment 106.

At 712, the virtual browsing engine 230 may determine a second subset of items 110 to be displayed on the display 232. The second subset of items 110 may include some of the items 110 in the first subset of items 110 such that the first and second subsets contain at least some of the same (i.e., overlapping) items 110. In one example, a second subset of items 110 that are arranged to the right of the first subset of items 110 within the virtual environment 400 may be determined at 712 if the movement of the mobile device 710 based on the second data is indicative of rightward translational and/or rotational movement of the mobile device 104. In this scenario, some of the items 110 in the second subset may have also been included in the first subset, such as items 110 in the first subset with image representations 108 that were displayed on a rightmost portion of the display 232 at step 708. By determining subsets of items 110 with overlapping sets of items 110, a smooth translation of the image representations 108 on the display 232 may be enabled as the device 104 is moved in the physical environment 106.

At 714, the user interface 100 of the mobile device 104 may be updated to display or otherwise render respective image representations 108 of the second subset of the items 110 on the display 232. In some embodiments, the image representations 108 pan smoothly across the display 232 as the mobile device 104 moves to dynamically simulate movement within the virtual environment 400 on the display 232. The process 700 may iterate in order to continue tracking movement of the mobile device 104 and updating the user interface 100 on the display 232 to browse through the items 110 within the virtual environment 400 as the mobile device 104 is moved about the physical environment 106.

In some embodiments, if the user 102 wants to browse or search for a different set of items 110, the user 102 may provide some form of user input to the mobile device 104 to indicate the desired change in the virtual browsing experience. For example, the user 102, after browsing items 110 related to a first object 300 in his/her physical environment 106, may see another real-world object of interest in the physical environment 106, and the user 102 may want to find item results 210 related to the other real-world object of interest. To indicate the transition from a first set of item results 210 to another set of item results 210, the user may shake the mobile device 104, or may provide some other type of gesture (e.g., a double tap on the display 232, a wave gesture of his/her hand in front of the inward-facing camera 112, etc.), or the user 102 may push a hard button or a soft button to end the current browsing session with the first item results 210 and to initiate, or otherwise transition to, a subsequent browsing session with a second set of items results 210.

Figure 8:
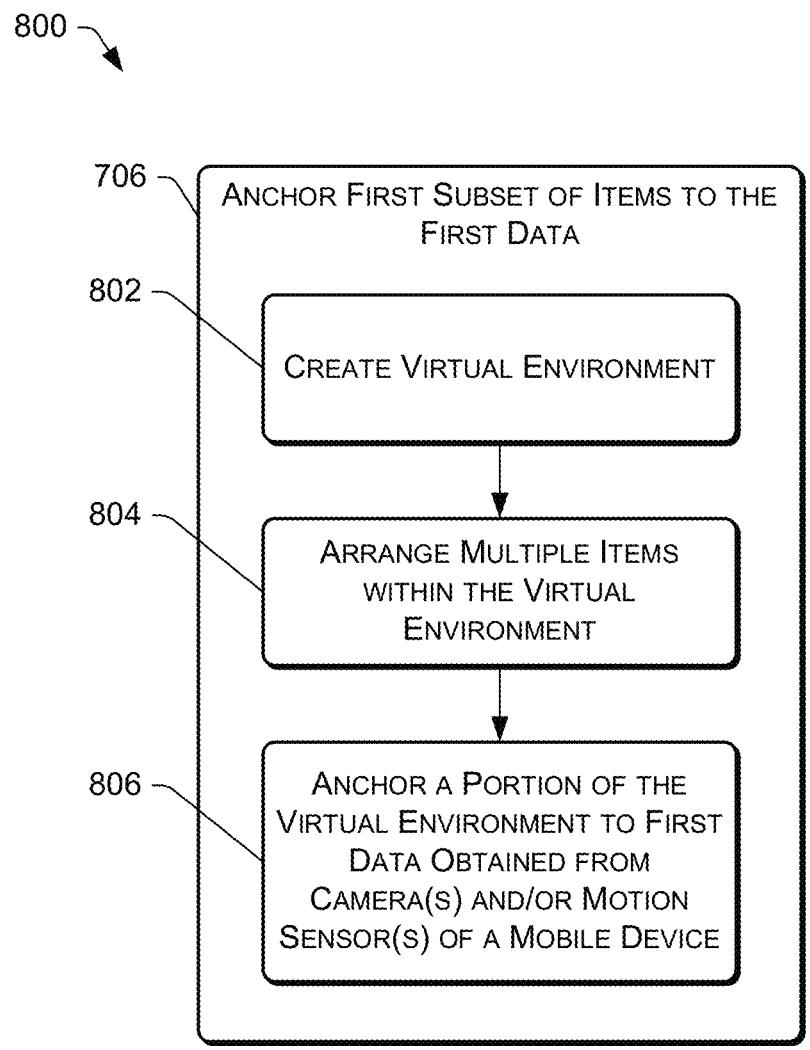
FIG. 8 is a flow diagram of an illustrative sub-process for anchoring a subset of items relative to first position information obtained from a mobile device.

FIG. 8 is a flow diagram of an illustrative sub-process 800 for anchoring a subset of items 110 to first data (or position information) obtained from a mobile device 104, corresponding to step 706 of the process 700. For discussion purposes, the process 800 is described with reference to the architecture 200 of FIG. 2.

At 802, the virtual browsing engine 230 may create a virtual environment 400 that is to be used as a framework to arrange items 110 and their associated image representations 108 for purposes of browsing within the virtual environment 400. The virtual environment 400 may be of any geometry, such as the virtual sphere 402 of FIGS. 4A and 4B, and may be defined by any suitable coordinate system or similar spatial positioning data.

At 804, multiple items, such as the item results 210 transmitted to the mobile device 104, may be arranged within the virtual environment 400. The arrangement at 804 may comprise assigning each item 110 in the item results 210 to a coordinate location within the virtual environment 400, and associating the respective image representations 108 of those items 110 with the coordinate locations.

At 806, the virtual browsing engine 230 may anchor a portion 408 of the virtual environment 400 to first data (or position information) that is obtained from camera(s) 112 and/or motion sensor(s) 114 of a mobile device 104. The first data may comprise a first scene 302 captured by the camera(s) 112 of the mobile device 104 so that the portion 408 of the virtual environment 400 can be anchored to the first scene 302. The portion 408 of the virtual environment 400 may be defined by a subset of coordinates within the virtual environment 400, and may effectively link the items 110 and their respective image representations 108 that are assigned to that subset of coordinates to the first data. In this manner, the virtual browsing experience is anchored by the first data to display a first subset of items 110 when the mobile device 104 is in a first position and orientation, and the remaining items 110 that are arranged within the virtual environment 400 relative to the first subset of items 110 can be rendered on the display 232 in response to movement of the mobile device 104.

Figure 9:
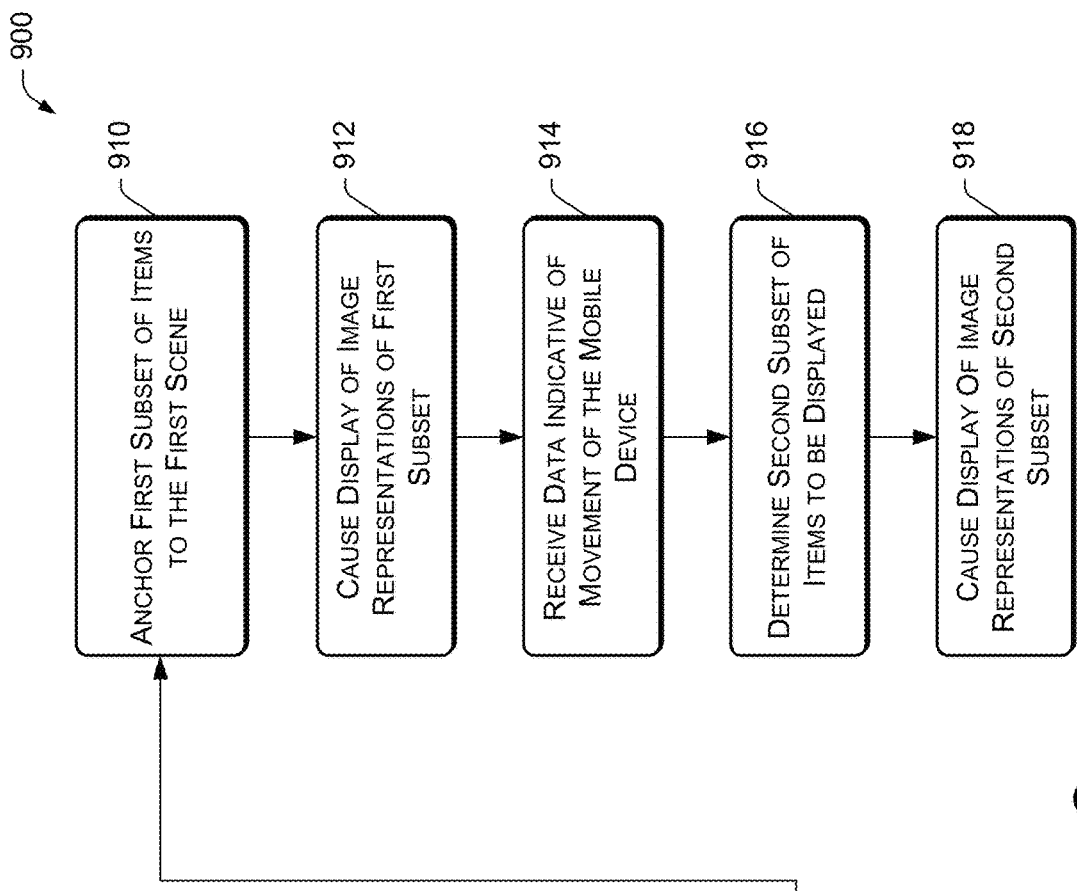
FIG. 9 is a flow diagram of an illustrative process for implementing a virtual browsing experience from a server based on a visual search query.
Figure 9:
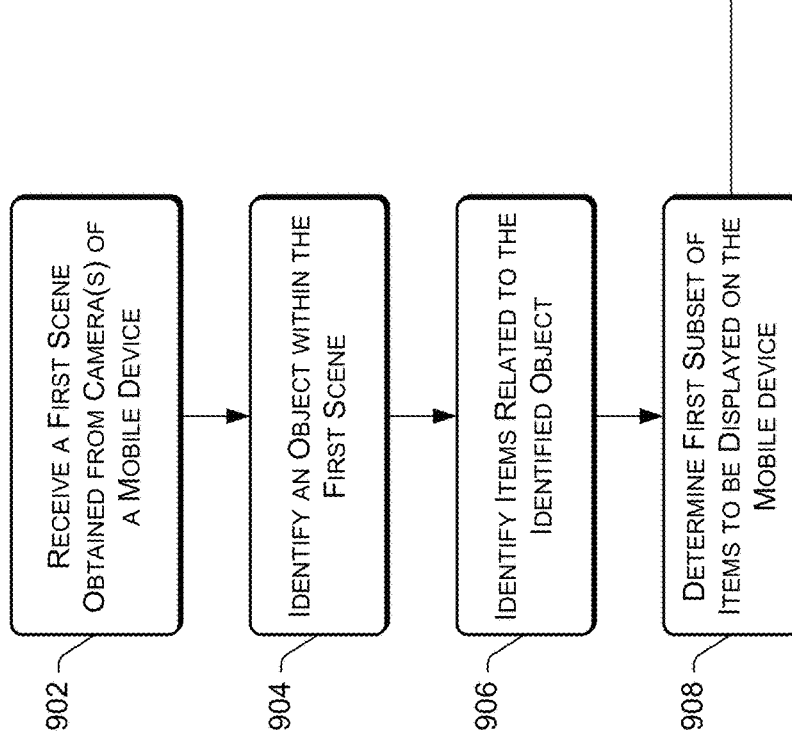

FIG. 9 is a flow diagram of an illustrative process 900 for implementing a virtual browsing experience from a server(s) 202 based on a visual search query. For discussion purposes, the process 900 is described with reference to the architecture 200 of FIG. 2.

At 902, the server(s) 202 may receive a first scene 302 that was obtained from a camera(s) 112 of a mobile device 104. For example, the camera(s) 112 of the mobile device 104 may transmit image data pertaining to the first scene 302 over the network 204.

At 904, the object identifier 216 may identify an object 300 within the first scene 302. In some embodiments, object identification at 904 may comprise matching the scene 302 with a stored image (e.g., an image of an item 110 stored in the item data 220). In some embodiments, the object identifier 216 may execute image analysis algorithms on the scene 302 to recognize the object 300, and may devolve the recognized features into a text query usable by the search engine(s) 218 to retrieve one or more items 110 matching the text query.

At 906, the search engine(s) 218 may identify items 110 related to the object 300 identified at 904. This may involve identifying an item 110 associated with an image that matches the image of the object 300 in the first scene 302 and/or identifying other items 110 related to the item 110 that matches the object 300.

At 908, a first subset of the items 110 identified at 906 may be determined by the virtual browsing engine 230 for display on a display 232 associated with the mobile device 104. For example, the first subset of items 110 may comprise a most relevant subset of items 110 with respect to the visual search query on the object 300.

At 910, the virtual browsing engine 230 may anchor the first subset of items 110 to the first scene 302 received at 902. At 912, the server(s) 202 may cause display of image representations 108 of the first subset of the items 110 on the display 232 associated with the mobile device 104.

At 914, the server(s) 202 may receive data (or position information) obtained from the mobile device 104 that is indicative of movement of the mobile device 104. For example, the data received at 914 may comprise a second scene captured by the camera(s) 112 of the mobile device 104 that can be analyzed using object detection and computer vision algorithms described herein to determine that the mobile device 104 has changed in position and/or orientation with respect to its position/orientation when the first scene 302 was captured prior to step 902.

At 916, a second subset of the items 110 identified at 906 may be determined by the virtual browsing engine 230 for display on a display 232 associated with the mobile device 104. For example, the second subset of items 110 be arranged within the virtual environment 400 at coordinates that are next to the coordinates assigned to the first subset of items 110. At 918, the server(s) 202 may cause display of image representations 108 of the second subset of the items 110 on the display 232 associated with the mobile device 104.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    capturing an image of a first scene by a camera of a mobile computing device, the image of the first scene encompassing an object in a physical environment of the mobile computing device;
    transmitting the image of the first scene to a service that is configured to identify the object and return a plurality of items based at least in part on an identification of the object;
    receiving image representations of the items returned by the service, wherein the items are associated with a plurality of rankings;
    detecting, using an object detection algorithm, the object within the first scene;
    defining a virtual environment according to a three-dimensional coordinate system that is mapped to the physical environment of the mobile computing device;
    selecting, from the items and based at least in part on the plurality of rankings, a first subset of the items to be anchored to the first scene;
    anchoring the first subset of the items to the first scene, wherein a first item of the first subset of the items is assigned to a coordinate of the three-dimensional coordinate system, and wherein the first item is assigned to the coordinate independent of a location of a physical object in the physical environment;
    displaying respective image representations of the first subset of the items on a display of the mobile computing device;
    capturing an image of a second scene by the camera of the mobile computing device;
    analyzing the image of the second scene to detect a change in position or orientation of the mobile computing device; and
    in response to detecting the change in the position or the orientation of the mobile computing device:
        selecting, from the items and based at least in part on the plurality of rankings, a second subset of the items to be anchored to the second scene, wherein the second subset comprises items associated with one or more rankings of the plurality of rankings that are lower than the one or more rankings associated with the items of the first subset; and
        displaying respective image representations of the second subset of the items on the display of the mobile computing device.

2. The method of claim 1, further comprising arranging the image representations of the items within the virtual environment such that each image representation is assigned to a coordinate of the three-dimensional coordinate system defining the virtual environment.

3. The method of claim 2, wherein anchoring the first subset of the items to the first scene comprises anchoring a respective image representation of an item of the items that is associated with a highest ranking.

4. The method of claim 1, further comprising:
    transmitting filtering criteria to the service; and
    receiving, from the service, the image representations of the items that have been filtered based on the filtering criteria.

5. A computer-implemented method, comprising:
    capturing, by a camera of a mobile computing device, an image of a first scene that encompasses an object in a physical environment of the mobile computing device;
    transmitting, to a service, the image of the first scene;
    receiving, from the service, a plurality of items to be displayed on a display associated with the mobile computing device, wherein the items are associated with a plurality of rankings;
    subsequent to receiving the items:
        determining, from the items and based at least in part on the plurality of rankings, a first subset of the items to be anchored to the first scene and to be displayed on the display;
        determining one or more locations in the physical environment captured in the first scene at which to anchor one or more items of the first subset of the items;
        generating a mapping between one or more items and the respective locations of the one or more items;
        anchoring the first subset of the items to the first scene;
        displaying, on the display, respective image representations of the first subset of the items;
        capturing, by the camera of the mobile computing device, an image of a second scene;
        analyzing the image of the second scene to detect a change in position or orientation of the mobile computing device;
        determining, from the items and based at least in part on the plurality of rankings, a second subset of the items to be anchored to the second scene and to be displayed on the display, wherein the second subset comprises items associated with one or more rankings of the plurality of rankings that are lower than the one or more rankings associated with the items of the first subset; and
        displaying, on the display, respective image representations of the second subset of the items.

6. The method of claim 5, wherein displaying the respective image representations of the first and second subsets of the items comprises displaying the respective image representations on virtual shelves of a virtual environment rendered on the display.

7. The method of claim 5, further comprising arranging image representations of the items within a virtual environment such that each image representation is assigned to a coordinate of a coordinate system defining the virtual environment.

8. The method of claim 7, wherein the image representations of the items are assigned to coordinates that define a virtual sphere within the virtual environment.

9. The method of claim 7, wherein the anchoring the first subset of the items to the first scene comprises mapping a subset of coordinates of the virtual environment to the first scene.

10. The method of claim 5, further comprising tracking, by a sensor device of the mobile computing device, movement of the mobile computing device to determine a direction of the movement.

11. The method of claim 5, wherein an item of the first subset of the items corresponds to the object in the physical environment.

12. The method of claim 5, wherein displaying the respective image representations of the first subset of the items comprises:
    displaying the first scene captured by the camera on the display associated with the mobile computing device; and
    displaying the respective image representations of the first subset of the items such that the respective image representations of the first subset of the items overlay the first scene on the display.

13. The method of claim 5, wherein an image representation, of the respective image representations of the first subset of the items, of the item comprises a three-dimensional (3D) image representation of the item that is rendered on the display from a first perspective of the 3D image representation, the method further comprising:
  detecting, by the camera of the mobile computing device, movement of the mobile computing device between two different positions in the physical environment of the mobile computing device; and
  in response to detecting the movement, rendering a second perspective of the 3D image representation on the display associated with the mobile computing device.

14. The method of claim 5, further comprising detecting, within the first scene, an additional object having a supporting surface, wherein displaying the respective image representations of the first subset of the items comprises:
  displaying the first scene captured by the camera on the display associated with the mobile computing device; and
  rendering, within the first scene on the display, the respective image representations at different locations on the supporting surface of the additional object.

15. The method of claim 5, further comprising:
transmitting filtering criteria to the service; and
receiving, from the service, the items that have been filtered based on the filtering criteria.

16. A mobile device, comprising:
one or more processors;
one or more cameras to capture images of scenes within a physical environment of the mobile device;
memory storing computer-executable instructions that are executable by the one or more processors to:
  transmit, to a service, an image of a first scene captured by the one or more cameras, the image of the first scene encompassing an object in the physical environment of the mobile device;
  receive, from the service, image representations of a plurality of items, wherein the items are associated with a plurality of rankings, the image representations of the items including first image representations of a first subset of the items and second image representations of a second subset of the items, wherein the one or more rankings associated with the items of the second subset are lower than the one or more rankings associated with the items of the first subset; and
  subsequent to receiving the image representations:
    determine, based at least in part on the image of the first scene, first position information for the mobile device;
    generate a first mapping between the first image representations of the first subset of the items and one or more first locations in the physical environment associated with the first position information;
    determine, based at least in part on an image of a second scene captured by the one or more cameras, second position information indicating that the mobile device moved within the physical environment; and
    generate a second mapping between the second image representations of the second subset of the items and one or more second locations in the physical environment associated with the second position information; and
  a user interface to render, on a display associated with the mobile device, at least one of the first image representations or the second representations based at least partly on at least one of the first position information or the second position information.

17. The mobile device of claim 16, wherein the computer-executable instructions are further executable by the one or more processors to detect that the mobile device moved by tracking objects detected within the images of the first and second scenes captured by the one or more cameras.

18. The mobile device of claim 16, wherein the computer-executable instructions are further executable by the one or more processors to arrange the image representations of the items within a virtual environment such that each image representation is assigned to a coordinate of a coordinate system defining the virtual environment.

19. The mobile device of claim 16, wherein the computer-executable instructions are further executable by the one or more processors to anchor the first subset of the items to the first position information by linking a subset of coordinates of a coordinate system defining a virtual environment to the first scene.

20. The mobile device of claim 16, wherein the computer-executable instructions are further executable by the one or more processors to display the image representations on virtual shelves of a virtual environment to be rendered on the display.

21. The mobile device of claim 16, wherein the computer-executable instructions are further executable by the one or more processors to:
  transmit filtering criteria to the service; and
  receive, from the service, the image representations of the items that have been filtered based on the filtering criteria.

* * * * *